United States Patent [19]
Habermeier et al.

[11] 3,846,442
[45] Nov. 5, 1974

[54] GLYCIDYL HYDANTOIN COMPOUNDS

[75] Inventors: Juergen Habermeier, Pfeffingen; Daniel Porret, Binningen, both of Switzerland

[73] Assignee: Ciba-Geigy AG, Basle, Switzerland

[22] Filed: Nov. 15, 1971

[21] Appl. No.: 198,989

[30] Foreign Application Priority Data
Nov. 17, 1970 Switzerland................... 16964/70

[52] U.S. Cl. ......... 260/309.5, 260/2 EP, 260/2 EA, 260/2 EC, 260/2 N, 260/13, 260/18 EP, 260/30.4 EP, 260/30.6 R, 260/31.8 E, 260/37 EP, 260/78.4 EP, 260/256.4 C, 260/260, 260/824 EP, 260/830 P, 260/830 TW, 260/830 S, 260/830 R, 260/831, 260/834, 260/836

[51] Int. Cl............................................ C07d 49/32
[58] Field of Search....................... 260/309.5

[56] References Cited
UNITED STATES PATENTS
| | | | |
|---|---|---|---|
| 2,556,146 | 6/1951 | Olsen............................. | 260/482 C |
| 2,703,810 | 3/1955 | Viard............................. | 260/482 B |
| 2,856,411 | 10/1958 | Prill................................ | 260/482 C |
| 2,937,119 | 5/1960 | Berger et al.................... | 260/482 B |
| 2,960,534 | 11/1960 | Scherer et al.................. | 260/553 R |
| 2,969,386 | 1/1961 | McElroy......................... | 260/482 B |
| 3,000,931 | 9/1961 | Frankel.......................... | 260/482 C |
| 3,347,658 | 10/1967 | Luckenbauch.................. | 260/553 R |

FOREIGN PATENTS OR APPLICATIONS
1,523,597   3/1968   Belgium.......................... 260/309.2

OTHER PUBLICATIONS

Degering, An Outline of Organic Nitrogen Compounds, page 532, Ypsilanti, Mich., Univ. Lithoprinters, 1950. QD251.D4.

Wagner et al., Synthetic Organic Chemistry, page 645, N.Y., Wiley, 1953. QD262.W24.

*Primary Examiner*—Natalie Trousof

[57] ABSTRACT

Binuclear N-heterocyclic N,N'-diglycidyl compounds are produced by the reaction at elevated temperature of 1 mole of a dialcohol, e.g. polypropylene glycol, with 2 moles of an epoxyisocyanate, the latter being obtained by the reaction of 1 mole of a polyisocyanate, e.g. isophoronediisocyanate, with 1 mole of an N-heterocyclic monoglycidyl compound, e.g. 3-glycidyl-5,5-dimethylhydantoin. Example: The new compound.

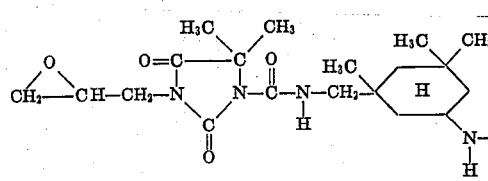 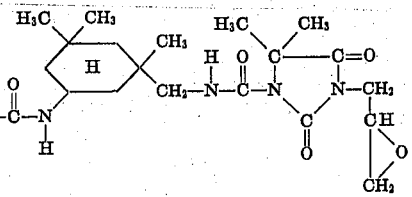

wherein *n* has an average value of 7.

The N,N'-diglycidyl compounds can be cured with epoxide resin curing agents to obtain moulded objects and coatings having good mechanical properties.

7 Claims, No Drawings

GLYCIDYL HYDANTOIN COMPOUNDS

The present invention relates to new binuclear N-heterocyclic N,N'-diglycidyl compounds of the formula:

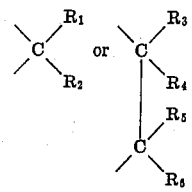

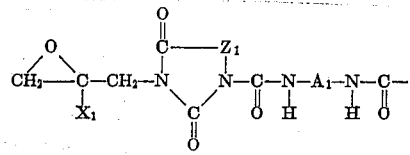
(I)

wherein $A_1$ and $A_2$ each represent a bivalent aliphatic, cycloaliphatic, cycloaliphatic-aliphatic, araliphatic, aromatic or heterocyclic-aliphatic radical; $Z_1$ and $Z_2$ each stand for a bivalent radical of the formula:

wherein $R_1$ and $R_2$ each represent a hydrogen atom, or an aliphatic, cycloaliphatic, araliphatic or aromatic hydrocarbon radical, or wherein $R_1$ and $R_2$ together form a bivalent aliphatic or cycloaliphatic hydrocarbon radical; wherein $R_3$ and $R_5$ each represent a hydrogen atom, or an aliphatic, cycloaliphatic, araliphatic or aromatic hydrocarbon radical; and wherein $R_4$ and $R_6$ each stand for a hydrogen atom or an alkyl radical; $X_1$ and $X_2$ each represent a hydrogen atom or a methyl group; and B represents the radical obtained by separation of the two hydroxyl groups of an aliphatic, cycloaliphatic, cycloaliphatic-aliphatic, araliphatic or heterocyclic-aliphatic dialcohol.

In the above formula (I), $A_1$ and $A_2$ each preferably represent a bivalent aliphatic, cycloaliphatic, cycloaliphatic-aliphatic, araliphatic or aromatic hydrocarbon radical, or a bivalent N-heterocyclic-aliphatic radical; $R_1$ and $R_2$ preferably represent hydrogen atoms or lower alkyl radicals having 1 to 4 carbon atoms, or $R_1$ and $R_2$ together represent the tetramethylene or pentamethylene radical; $R_3$, $R_4$, $R_5$ and $R_6$ preferably represent hydrogen atoms or lower alkyl radicals having 1 to 4 carbon atoms; and $X_1$ and $X_2$ are preferably hydrogen atoms.

At room temperature, the new N,N'-diglycidyl compounds of formula (I) are, as a rule, viscous to solid resins, which can be processed, as they are or in admixture with reactive diluting agents, with the use of conventional curing agents for epoxide resins, such as dicarboxylic acid anhydrides or polyamines, to obtain moulded shapes possessing good mechanical and electrical properties.

Preferred fields of application, besides the casting-resin field, are those of powder resins such as in the case of whirl sinter powders and moulding powders.

The new diepoxides of formula (I) can be produced according to the invention by the reaction, with heating, of 1 mole of a dialcohol of the formula:

$$HO-B-OH \quad (II)$$

with 2 moles of an expoxisocyanate of the formula:

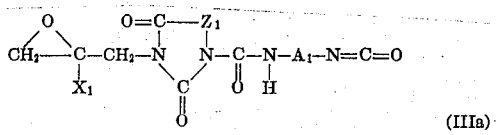
(IIIa)

or of the formula:

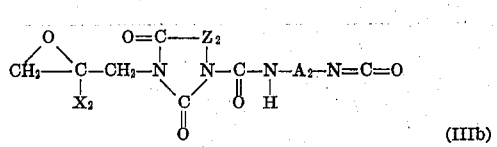
(IIIb)

wherein the symbols $A_1$, $A_2$, $Z_1$, $Z_2$, $X_1$, $X_2$ and B have the same meanings as in formula (I). In this manner are obtained symmetrically formed diepoxides of formula (I). Unsymmetrically formed diepoxides (I) can be obtained, e.g. by reacting the dialcohol of formula (II) with a mixture of two different epoxyisocyanates of formulae (IIIa) and (IIIb).

The reaction of the dialcohols (II) with the epoxyisocyanates (III) is advantageously performed with the exclusion of atmospheric moisture and in the temperature range of 60°–200°C, preferably at temperatures of 80°–150°C, for, e.g. 2 to 20 hours. The process can be carried out in the presence of solvents or without solvents. Suitable dialcohols of formula (II) are, in particular, those of the aliphatic, cycloaliphatic and heterocyclic-aliphatic series.

The following are mentioned as dialcohols of the aliphatic series: ethylene glycol, 1,2-propanediol, 1,3-propanediol, 1,4-butanediol, 1,5-pentanediol, neopentyl glycol, 1,6-hexanediol, 1,7-heptanediol, 1,8-octandeiol, 1,9-nonanediol, 1,10-decandeiol, 1,11-undecanediol, 1,12-dodecandediol, 1,6-dihydroxy-2,2,4-trimethylhexane, 1,6-deihydroxy-2,4,4-trimethylhexane, 1,4-butenediol; polyether glycols such as diethylene glycol, triethylene glycol, tetraethylene glycol, dipropylene glycol, polyethylene glycols and polypropylene glycols of average molecular weight of 250 to 2,500, polybutylene glycols and polyhexanediols; hydroxypolyesters such as hydroxypivalic acid neopentyl glycol diester.

Mentioned as dialcohols of the cycloaliphatic series are: 1,1-, 1,2-, 1,3- and 1,4-bis(hydroxymethyl) cyclohexane and the corresponding unsaturated cyclohexene derivatives such as, e.g. 1,1-bis-(hydroxymethyl)-cyclohexene-3 and 1,1-bis-(hydroxymethyl)-2,5-methylenecyclohexene-3; hydrogenated diphenols such as cis-quinite, trans-quinite, resorcite, 1,2-dihydroxycyclohexane, bis(4-hydroxycyclohexyl)-methane, 2,2-bis(4'-hydroxycycloehxyl)propane; tricyclo-(5.2.1.0$^{2,6}$)decane-3,9- or -4,8-diol, adducts of glycols with diallylidenepentaerythrite, e.g. 3,9-bis-(hydroxyethoxyethyl)-spirobi(metadioxane).

Suitable dialcohols of the heterocyclic-aliphatic series are, in particular, the addition products of at least 2 moles of an alkene oxide such as ethylene oxide, propene oxide, 1,2-butene oxide or styrene oxide with 1 mole of a mononuclear or polynuclear N-heterocyclic compound having two endocyclic NH-groups such as, in particular, hydantoin and its derivatives, dihydrouracil and its derivatives, barbituric acid and its derivatives, bishydantoins and bis-dihydrouracils. The following are listed:

1,3-di-(β-hydroxyethyl)-5,5-dimethylhydantoin,
1,3-di-(β-hydroxyethyl)-5-phenyl-5-ethylbarbituric -ethylbarbituric acid,
1,3-di-(β-hydroxy-n-propyl)-5,5-dimethylhydantoin,
1,3-di-(β-hydroxy-n-propyl)-5,5-diethylbarbituric acid,
1,3-di-(β-hydroxyethyoxyethoxyethyl)-5,5-dimethylhydantoin,
1,3-di-(β-hydroxy-n-propyl)-5-isopropylhydantoin,
1,3-di-(β-hydroxy-n-propyl)-5,5-diethylhydantoin,
1,3-di-(β-hydroxy-n-propyl)-5-ethyl-5-methylhydantoin,  1,3-di-(β-hydroxyethyl)-5,5-diemthyl-6-isopropyl-5,6-dihydrouracil,
1,3-di-(β-hydroxy-n-propyl)-5,5-dimethyl-5-isopropyl-5,6-dihydrouracil,
1,3-di-(2'-hydroxy-n-butyl)-5,5-dimethylhydantoin,
1,3-di-(β-hydroxy-β-phenylethyl)-5,5-dimethylhydantoin,
1,3-di-(β-hydroxy-β-phenylethyl)-6-methyluracil,
1,3-di-(β-hydroxy-β-phenylethyl)-5,5-dimethyl-6-isopropyl-5,6-dihydrouracil,
1,3-di-(β-hydroxy-β-phenylethoxy-β-phenylethoxy-β-phenylethyl)-5,5-dimethylhydantoin,
1,3-di-(β-hydroxy-β-phenylethyl)-5-isopropylhydantoin,
1,3-di-(β-hydroxy-β-phenylethyl)-5-ethyl-5-phenylbarbituric acid,
1,1'-methylene-bis-(3-β-hydroxyethyl-5,5-dimethylhydantoin),
1,1'-methylene-bis-(3-β-hydroxyethyoxyethoxyethyl-5,5-dimethylhydantoin),
1,1'-methylene-bis-(3-β-hydroxy-n-propyl-5,5-dimethylhydantoin),
1,1'-methylene-bis-(3-β-hydroxyethyl-5,5-dimethyl-5,6-dihydrouracil),
1,4-bis-(1'-β'-hydroxyethyl-5', 5'-dimethylhydantoinyl-3')-butane,
1,6-bis-(1'-β'-hydroxyethyl-5',5'-dimethylhydantoinyl-3')-hexane,
1,6-bis-(1'-β'-hydroxy-n-propyl-5',5'-dimethylhydantoinyl-3')-hexane,
1,1'-methylene-bis-(3-β-hydroxypropyl-5-isopropylhydantoin),
1,1'-methylene-bis-(3-β-hydroxy-n-propyl-5,5-dimethyl-5,6-dihydrouracil),
1,1'-methylene-bis-(3-(2''-hydroxy-n-butyl)-5,5-dimethyl-hydantoin),
1,6-bis-(1'-(2''-hydroxy-n-butyl)-5', 5'-dimethylhydantoinyl-3')-hexane,
β, β'-bis-(1-(2'-hydroxy-n-butyl)-5,5-diemthylhydantoinyl-3)-diethyl ether,
1,1'-methylene-bis-(3-(β-hydroxy-β-phenylethyl))-5,5-dimethylhydantoin.

The epoxyisocyanates of formulae (III a) and (III b) are new compounds. They can be produced by the reaction, with heating, of 1 mole of a diisocyanate of the formula:

OCN-A₁-NCO      IVa.
and
OCN-A₂-NCO      IV b.

with 1 mole of an N-heterocyclic monoglycidyl compound of the formula:

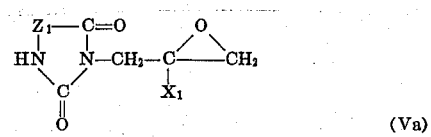

(Va)

and

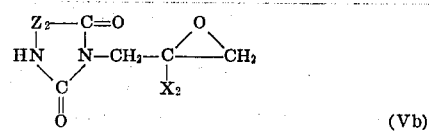

(Vb)

respectively, wherein $A_1$, $A_2$, $Z_1$, $Z_2$, $X_1$ and $X_2$ have the same meanings as in formula (I).

The reaction of the diisocyanates (IV a) and (IV b) with the monoglycidyl compounds Va and Vb respectively is performed under reaction conditions analogous to the reaction of the dialcohols of formula (II) with the epoxyisocyanates of formulae (III a) or (III b). It is advantageous to react the diisocyanates with the N-heterocyclic monoglycidyl compounds in the stoichiometrical quantity ratio (molar ratio 1:1); it is also possible, however, to use the diisocyanates in a stoichiometric excess, so that in the reaction mixture the molar ratio of the N-heterocyclic compound to the diisocyanate can be 1:1 to, e.g. 1:5.

No protection is claimed here for the new epoxyisocyanates of formulae (III a) and (III b) and for the process for their production.

Suitable diisocyanates of formulae (IV a) or (IV b) are those of the aliphatic, cycloaliphatic, araliphatic, aromatic and heterocyclic-aliphatic series.

The following are listed as diisocyanates of the aliphatic, cycloaliphatic and araliphatic series:
ethylenediisocyanate, trimethylenediisocyanate, tetramethylenediisocyanate, hexamethylenediisocyanate, decamethylenediisocyanate, 2,2,4- and 2,4,4-trimethylhexamethylenediisocyanate, or commercial mixtures thereof; diisocyanates of the formula OCN-Y-NCO wherein Y denotes the hydrocarbon radical of an optionally hydrogenated dimerised fatty alcohol;
cyclopentylenediisocyanate-1,3,
cyclohexylenediisocyanate-(1,4), -(1,3) or -(1,2),
hexahydrotoluylenediisocyanate-(2,4) or -(2,6),
3,5,5-trimethyl-3-isocyanatomethyl-cyclohexaneisocyanate-(1) (="isophoronediisocyanate"):
dicyclohexyl-methane-diisocyanate-(4,4'), o-, m- and p-xylylene-α,α'-diisocyanate.

Mentioned as diisocyanates of the aromatic series are:
toluylenediisocyanate-(2,4), toluylenediisocyanate-(2,6), or commercial mixtures thereof;
diphenylmethane-4,4'-diisocyanate,
naphthalene-1,5-diisocyanate,
3,3'-diemthyl-biphenyl-4,4'-diisocyanate,
3,3'-dimethoxy-4,4'-diphenyldiisocyanate,
3,3'-dichlorodiphenyl-4,4'-diisocyanate,
4,4'-diphenyldiisocyanate, diphenyldimethyl-methane-4,4'-diisocyanate,
p,p'-dibenzyldiisocyanate,
phenylene-1,4-diisocyanate,
phenylene-1,3-diisocyanate,
2,3,5,6-tetramethyl-p-phenylenediisocyanate;
the uretdionediisocyanates obtained by dimerisation of aromatic diisocyanates such as, e.g. 2,4-toluylenediisocyanate, e.g. 1,3-bis-(4'-methyl-3'-isocyanatophenyl)-uretdione of the formula:

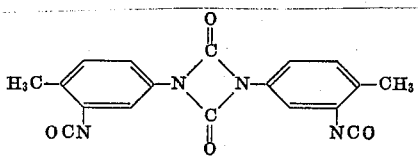

N,N'-di-(4-methyl-3-isocyanatophenyl)-urea.

Also listed as diisocyanates are those of the heterocyclicaliphatic series, e.g.:

1,3-di-( γ-isocyanatopropyl)-hydantoin, 1,3-di-(γ-isocyanato-propyl)- 5-methylhydantoin, 1,3-di-(γ-isocyanatopropyl)-5,5-dimethylhydantoin, 1,3-di-(γ-isocyanatopropyl)-5-methyl-5-ethylhydantoin, 1,3-di-( γ-isocyanatopropyl)-5-ethylhydantoin, 1,3-di-(γ-isocyanatopropyl)-5-propylhydantoin, 1,3-di-(γ-isocyanatopropyl)-5-isopropylhydantoin, 1,3-di-(γ-isocyanatopropyl)-1,3-diazaspiro-(4,4)-nonane-2,4-dione and 1,3-di-( γ-isocyanatopropyl)-1,3-diazaspiro-(4,5)-decane-2,4-dione, 1,3-di-(γ-isocyanatopropyl)-5,5-dimethyl-5,6-dihydrouracil and 1,3-di-(γ-isocyanatopropyl)-6-methyl-5,6-dihydrouracil;

1,1'-methylene-bis-(3-γ-isocyanatopropylhydantoin); 1,1'-methylene-bis-(3-γ-isocyanatopropyl-5,5-dimethylhydantoin; 1,1'-methylene-bis-(3-γ-isocyanatopropyl-5-methyl-5-ethylhydantoin); bis-(1'-γ-isocyanatopropylhydantoinyl-3')-methane; 1,2-bis-(1'-γ-isocyanatopropyl-5',5'-dimethylhydantoinyl-3')-ethane; 1,4-bis-(1'-γisocyanatopropyl-5'-methyl-5'-ethylhydantoinyl-3')-butane; 1,6-bis-(1'-γ-isocynatopropyl-5'-isopropylhydantoinyl-3')-hexane; 1,12-bis-(1'-γ-isocyanatopropyl-5', 5'-pentamethylenehydantoinyl-3'7-dodecane and β,β'-bis-(1'-γ-isocyanatopropyl-5',5'-diemthylhydantoinyl-3')-diethyl ether.

The N-heterocyclic monoglycidyl compounds of formulae (V a) and (V b) can be produced in a known manner by the reaction, in the first stage, of 1 mole of an N-heterocyclic compound of the formula:

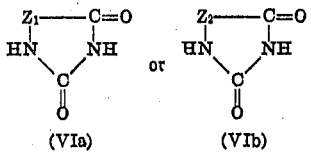

wherein $Z_1$ or $Z_2$ has the same meaning as in formula (I) with 1 mole of an epihalohydrin or of a β-methylepihalohydrin, preferably with 1 mole of epichlorohydrin or of β-methylepichlorohydrin, in the presence of a catalyst such as, preferably, a tertiary amine, a quaternary ammonium base or a quaternary ammonium salt, such as benzyltrimethylammonium chloride, under conditions whereby only the more strongly acid endocyclic NH-group in position 3 of the ring is substituted, to give the halohydrin; and the treatment, in the second stage, of the obtained product containing halohydrin groups with agents splitting off hydrogen halides, preferably with strong alkalis such as sodium hydroxide.

The N-heterocyclic compounds of formulae (IV a) or (IV b) are, in particular, hydantoin, hydantoin derivatives, dihydrouracil and dihydrouracil derivatives.

The hydantoin and its preferred derivatives correspond to the general formula:

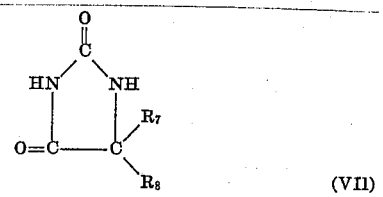

(VII)

wherein $R_7$ and $R_8$ each represent a hydrogen atom, or a lower alkyl radical having 1 to 4 carbon atoms, or wherein $R_7$ and $R_8$ together form a tetramethylene or pentamethylene radical. The following are mentioned: 5-methylhydantoin, 5-methyl-5-ethylhydantoin, 5-n-propylhydantoin, 5-isopropylhydantoin, 1,3-diazaspiro(4.5)-decane-2,4-dione, 1,3-diazaspiro(4.4)-nonane-2,4-dione, and preferably 5,5-dimethylhydantoin.

The dihydrouracil (=2,4-dioxohexahydropyrimidine) and its preferred derivatives correspond to the general formula:

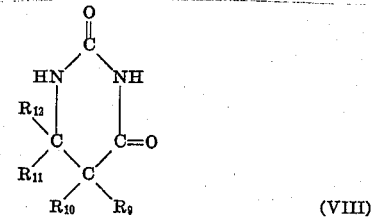

(VIII)

wherein $R_9$ and $R_{10}$ both represent a hydrogen atom, or identical or different alkyl radicals, preferably alkyl radicals having 1 to 4 carbon atoms; and $R_{11}$ and $R_{12}$ each represent, independently of each other, a hydrogen atom or an alkyl radical.

Preferably, in the above formula, the two radicals $R_7$ and $R_8$ represent methyl groups; $R_9$ represents a hydrogen atom, or a lower alkyl radical having 1 to 4 carbon atoms; and $R_{10}$ a hydrogen atom. Mention is made of: 5,6-dihydrouracil, 5,5-dimethyl-5,6-dihydrouracil (2,4-dioxo-5,5-dimethylhexahydropyrimidine) and 5,5-dimethyl-6-isopropyl-5,6-dihydrouracil (2,4-dioxo-5,5-dimethyl-6-isopropylhexahydropyrimidine).

In the hydantoins and dihydrouracils concerned, the NH-group in 3-position, which lies between the two carbonyl groups, has acid character and can be determined quantitatively, e.g. by potentiometric titration with alkali.

Particularly good yields of monoglycidyl compound (V a) or (V b) are obtained by employing in the reaction mixture a stoichiometric excess of epichlorohydrin or methylepichlorohydrin above the amount necessary for the addition to the NH-group in 3-position of the heterocyclic ring.

During the catalytic addition of the epichlorohydrin in the first reaction step, before the addition of alkali, there already occurs a partial epoxidation of the dichlorohydrin of the hydantoin. The epichlorohydrin, which acts as a hydrogen chloride acceptor, is then partly converted into glycerin dichlorohydrin. In the reaction of the above described hydantoins or dihydrouracils with a stoichiometric excess of epichlorohydrin beyond the amount required for monoglycidylation, in the presence of a catalyst, the acid NH-group in position 3 of the ring reacts more quickly than the NH-group in position 1 of the ring. It is possible, therefore, for the more strongly acid NH-group to be reacted with the epichlorohydrin substantially quantitatively, before the more weakly acid NH-group has appreciably reacted. If, therefore the reaction leading to chlorohydrin is interrupted at the right moment (evidence of the consumption of approximately 1 mole of epichlorohydrin per mole of hydantoin or dihydrouracil from a test of a sample of the reaction mixture), and a reaction then performed with the equivalent amount of alkali, then the monoglycidyl derivative of formula (V a) or (V b) is obtained as the main product.

Advantageously, the intermediates of formulae (III a) or (III b) and the final products of formula (I) are produced in a single two-stage process, without isolation of the intermediates (III a) or (III b).

A preferred embodiment of the process according to the invention consists in the reaction at elevated temperature, in the first stage, of 1 mole of a diisocyanate of formulae (IV a) or (IV b) with 1 mole of a heterocyclic monoglycidyl compound of formula (V a) or (V b); and then the further reaction at elevated temperature, in the second stage, of the obtained 1:1 adduct, without isolation, with a dialcohol of formula (II) in the ratio of 1 equivalent of hydroxyl groups of the dialcohol per equivalent of the isocyanate group of the adduct.

The new diglycidyl compounds of formula (I) according to the invention react with the usual curing agents for polyepoxide compounds, and they can thus be cross-linked and cured by the addition of such curing agents in a manner analogous to that for other polyfunctional epoxide compounds and epoxide resins. Basic or acid compounds come into consideration as curing agents.

Mentioned as suitable curing agents are, e.g.: amines or amides, such as aliphatic, cycloaliphatic or aromatic, primary, secondary and tertiary amines, e.g. monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis-(4-amino-3-methylcyclohexyl)-methane, 3,5,5-trimethyl-3-(aminomethyl)-cyclohexylamine ("isophoronediamine"), Mannich bases such as 2,4,6-tris-(dimethylaminomethyl)-phenol; m-phenylenediamine, p-phenylenediamine, bis-(4-aminophenyl)-methane, bis-(4-aminophenyl)-sulphone, m-xylylenediamine; N-(2-aminoethyl)-piperazine; adducts of acrylonitrile or monoepoxides, such as ethylene oxide or propylene oxide, with polyalkylenepolyamines such as diethylenetriamine or triethylenetetramine; adducts from polyamines, such as diethylenetriamine or triethylenetetramine, in excess and polyepoxides such as diomethanepolyglycidyl ethers; ketimines, e.g. from acetone or methyl ethyl ketone and bis(p-aminophenyl)-methane; adducts from monophenols or polyphenols and polyamines; polyamides, especially those from aliphatic polyamines such as diethylenetriamine or triethylenetetramine, and di- or trimerisated unsaturated fatty acids such as dimerisated linseed oil fatty acid ("VERSAMID"); polymeric polysulphides ("THIOKOL"); dicyanodiamide, aniline/formaldehyde resins; polyvalent phenols, e.g. resorcin, 2,2-bis-(4-hydroxyphenyl)-propane or phenol/formaldehyde resins; boron trifluoride and complexes thereof with organic compounds such as $BF_3$-ether complexes and $BF_3$-amine complexes, e.g. $BF_3$-monoethylamine complex; acetoacetanilide-$BF_2$-complex; phosphoric acid; triphenylphosphite; polybasic carboxylic acids and their anhydrides, e.g. phthalic acid anhydride, $\Delta^4$-tetrahydrophthalic acid anhydride, hexahydrophthalic acid anhydride, 4-methylhexahydrophthalic acid anhydride, 3,6-endomethylene- $\Delta^4$-tetrahydrophthalic acid anhydride, methyl-3,6-endomethylene-$\Delta^4$-tetrahydrophthalic acid anhydride (= methylnadicananhydride), 3,4,5,6,7,7-hexachloro-3,6-endomethylene-$\Delta^4$-tetrahydrophthalic acid anhydride, succinic acid anhydride, adipic acid anhydride, azelaic acid anhydride, sebaccic acid anhydride, maleic acid anhydride, dodecenylsuccinic acid anhydride; pyromellitic acid dianhydride, or mixtures of such anhydrides.

In the curing process, it is also possible to use curing accelerators; with the use of polyamides, dicyanodiamide, polymeric polysulphides or polycarboxylic acid anhydrides as curing agents, suitable accelerators are, e.g. tertiary amines, their salts or quaternary ammonium compounds, e.g. 2,4,6-tris-(dimethylaminomethyl)-phenol, benzyldimethylamine, 2-ethyl-4-methylimidazole, 4-aminopyridine, triamylammonium phenolate; also alkali metal alcoholates, such as, e.g. sodium hexanetriolate. In the case of amine curing, it is possible to use as accelerators, e.g. mono- or polyphenols such as phenol or diomethane, salicyclic acid or thiocyanates.

The expression "curing," as employed here, means the transformation of the aforesaid diepoxides into insoluble and unmeltable, cross-linked products, this occurring, as a rule, with the simultaneous moulding of the material to produce moulded shapes, such as cast objects, pressed objects, or laminates and suchlike, or to obtain "flat-shaped articles" such as coatings, lacquer films, or bonds (adhesives).

Depending on the choice of curing agent, curing can be carried out at room temperature (18°–25°C), or at elevated temperature (e.g. 50°–180°C).

The curing operation can optionally be performed also in two stages by firstly prematurely interrupting the curing reaction, or by carrying out the first stage at only moderately elevated temperature, whereupon a curable precondensate (known as the "B-stage") which is still meltable and soluble is obtained from the epoxide component and the curing-agent component. Such a precondensate can be used, e.g. for the production of "prepregs," moulding materials or sinter powders.

The present invention also relates, therefore, to curable mixtures which are suitable for the production of moulded articles, including flat-shaped articles, and which contain the diglycidyl compounds according to the invention, optionally together with other polyepoxide compounds, and also curing agents for epoxide resins, such as polyamines or polycarboxylic acid anhydrides.

To the diepoxides according to the invention, or to mixtures thereof with other polyepoxide compounds and/or curing agents, it is possible to add before curing, in any particular phase, the usual modifying agents such as extenders, fillers and toughening agents, pigments, dyestuffs, organic solvents, softeners, flow control agents, thixotropic agents, fire-retarding agents, and mould-release agents.

Examples of extenders, toughening agents, fillers and pigments which can be used in the curable mixtures according to the invention are as follows: coal tar, bitumen, glass fibres, boron fibres, carbon fibres, asbestos fibres, natural and synthetic textile fibres such as polyester fibres, polyamide fibres, polyacrylonitrile fibres; polyethylene powder, polypropylene powder; quartz flour; mineral silicates such as mica, asbestos flour, slate flour; kaolin, aluminium oxide trihydrate, chalk flour, gypsum, antimonous trioxide, bentone, silicic acid aerogel ("AEROSIL"), lithopone, heavy spar, titanium dioxide, soot, graphite, oxide dyes such as iron oxide or metal powder such as aluminium powder or iron powder.

Suitable organic solvents for the modification of the curable mixtures are, e.g. toluene, xylene, n-propanol, butylacetate, acetone, methyl ethyl ketone, diacetone alcohol, ethylene glycol monomethyl ether, -monoethyl ether and -monobutyl ether.

As softeners for the modification of the curable mixtures it is possible to use, e.g. dibutyl-, dioctyl- and dinonylphthalate, tricresylphosphate, trixylenephosphate, and also polypropylene glycols.

As flow control agents on application of the curable mixtures, especially in the case of surface protection, it is possible to add, e.g. silicones, cellulose acetobutyrate, polyvinylbutyral, waxes, stearates (which in some cases are also used as mould-release agents).

Specially for application in the lacquer field, it is also possible for the diepoxide compounds to be partially esterified, in a known manner, with carboxylic acids such as, in particular, higher unsaturated fatty acids. It is moreover possible to add to such lacquer-resin compositions other curable synthetic resins, e.g. phenoplasts or aminoplasts.

The curable mixtures according to the invention can be produced, in the usual manner, with the aid of the usual mixing aggregates (stirrer, kneader, rollers).

The curable epoxide resin mixtures according to the invention are used, in particular, in the field of surface protection, in electrical engineering, for laminating processes, and in the building industry. They can be used in the form best suited for the purpose for which they are required, e.g. in the filled or unfilled state, optionally in the form of solutions of emulsions, as coating agents, lacquers, as moulding materials, sinter powders, dip resins, casting resins, injection-moulding compositions, impregnation resins and bonding agents, adhesives, as tool resins, laminating resins, sealing materials and fillers, floor-covering materials, and bonding agents for mineral aggregates.

Where otherwise not stated in the following examples, the term 'parts' denotes parts by weight, and percentages signify per cent by weight. Parts by volume and parts by weight have the same ratio to each other as millimetre and gram.

With regard to the mechanical and electrical properties of the curable mixtures described in the following examples, plates of the size 92 × 41 × 12 mm were prepared for the determination of bending strength, deflection impact strength and water absorption. The specimens (60 × 10 × 4 mm) for the determination of water absorption and for the bending and impact test (VSM 77103 and VSM 77105) were cut out from the plates.

For determination of dimensional stability in the heat according to Martens (DIN 53,458), specimens were cast in each case having the dimensions 120 × 15 × 10 mm.

Plates of the dimensions 120 × 120 × 4 mm were cast for the testing of arc resistance and tracking resistance (VDE 0303).

A. Production of starting materials
1. Monoglycidyl derivatives from 1 mole of epichlorohydrin and 1 mole of a hydantoin or dihydrouracil
  a. 3-Glycidyl-5,5-dimethylhydantoin A mixture of 128 g of 5,5-dimethylhydantoin (1 mole), 2775 g of epichlorohydrin (30 moles) and 0.66 g of benzyltrimethylammonium chloride was heated to 118°C for 95 minutes. A sample taken from the reaction mixture then showed, after the excess epichlorohydrin and the formed 1,3-dichloropropan-(2)-ol had been distilled off, an epoxide content of 2.78 epoxide equivalents/kg. The reaction mixture was cooled to 60°C, and an addition was then made in small portions, within 20 minutes and with vigorous stirring, of 42.3 g of finely powdered sodium hydroxide (1.05 moles). After the addition was completed, the mixture was stirred for a further 30 minutes at 60°C. The water formed during the reaction was subsequently removed by azeotropic distillation, together with a portion of the epichlorohydrin, at 60°C and under 35 Torr. After cooling, the formed sodium chloride was separated off by filtration, and the clear filtrate was concentrated firstly at 30 Torr and then in high vacuum.

In this manner were obtained 198.5 g (theoretical amount for (N)3-glycidyl-5,5-dimethylhydantoin: 184 g) of a slightly yellow coloured crystal mass having an epoxide content of 4.96 epoxide equivalents/kg (theoretical amount for (N)3-glycidyl-5,5-dimethylhydantoin: 5.43 epoxide equivalents/kg).

The product was recrystallised once from methyl ethyl ketone and once from acetone, and (N)3-glycidyl-5,5-dimethylhydantoin was obtained as pure white crystal powder.
M.P.: 97°–98°C. Epoxide content: 5.45 epoxide equivalents/kg (theoret. 5.43) Chlorine content 0.2%

| Elementary analysis: | Found | Calculated |
|---|---|---|
| C | 52.11 % | 52.16 % |
| H | 6.57 % | 6.57 % |
| N | 15.00 % | 15.21 % |

The product consists essentially of 3-glycidyl-5,5-dimethylhydantoin of the structure:

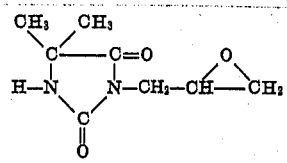

b. 3-(β-methylglycidyl)-5,5-dimethyl-6-isopropyl-5,6-dihydrouracil

A mixture of 328.8 g of 5,5-dimethyl-6-isopropyl-5,6-dihydrouracil (=2,4-dioxo-5,5-dimethyl-6-isopropylhexahydropyrimidine) (1.782 moles), 1900 g of β-methylepichlorohydrin (17.85 moles) and 8.82 g of tetraethylammonium chloride is stirred for 3 hours at reflux temperature (115° to 122°C); and a clear colourless solution is thus obtained. This is then cooled to 60°C, and to it are slowly added dropwise in the course of 2 hours at 60°C, with vigorous stirring, 192.5 g of 50 percent sodium hydroxide solution (2.4 moles); the water present in the reaction mixture is at the same time continually separated by means of azeotropic circulatory distillation under 60 to 90 Torr vacuum. After completion of the addition of sodium hydroxide solution, entrainment of water is continued for a further 30 min. The sodium chloride formed during the reaction is then separated by filtration, and afterwards rinsed with 50 ml of β-methylepichlorohydrin. The combined solutions are extracted by shaking with 180 ml of water to effect the removal of residues of sodium chloride and of the catalyst.

After separation of the aqueous layer, the organic phase is concentrated at 60°C/18 Torr, and then treated at 60°C/0.1 Torr until the weight remains constant.

A crystalline, colourless product is obtained with 3.92 epoxide equivalents/kg (100 percent of theoretical amount); the yield is 432.0 g (95 percent of the theoretical value).

For purification, the thus obtained 3-(β-methylglycidyl)-5,5-dimethyl-6-isopropyl-5,6-dihydrouracil can be recrystallised from water/methanol (5:1). The purified product melts at 106° to 108°C.

The elementary analysis is as follows:

| Found: | Calculated: |
|---|---|
| 61.44 % C | 61.39 % C |
| 8.54 % H | 8.72 % H |
| 11.21 % N | 11.02 % N |
| <0.3 % Cl | 0.0 % Cl |

The vapour-pressure osmometrical molecular weight determination gives a molecular weight of 255 (calculated: 254.32).

The nuclear-magnetic resonance spectrum (60 Mc HNMR, taken in deuterochloroform) proves, together with the above data, by the presence of the following signals, the structure given below:

| 1 proton at | δ=6.72 | N₁—H (for N₃H δ would be >10.0). |
| 2 protons at | δ=3.45–4.20 | N—CH₂—C— (multiplet). HN— |
| 1 proton at | δ=2.90–3.05 | HC— (multiplet). |
| 2 protons at | δ=2.47–2.80 | O CH₃ CH₂—C—CH₂— (quartet). |
| 1 proton at | δ=1.50–2.30 | H₃C C— (multiplet). H₃C H |

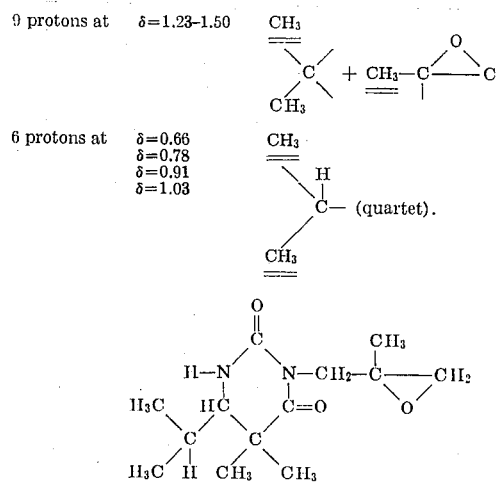

| 9 protons at | δ=1.23–1.50 |
| 6 protons at | δ=0.66 δ=0.78 δ=0.91 δ=1.03 |

2. Epoxyisocyanates a. Adduct from 1 mole of 3-glycidyl-5,5-dimethylhydantoin and 1 mole of isophoronediisocyanate In a dry glass flask fitted with stirrer, thermometer and reflux condenser, 92.1 g of 3-glycidyl-5,5-dimethylhydantoin (0.5 moles) and 113.5 g (0.52 moles) of 3,5,5-trimethyl-3-isocyanatomethyl-cyclohexane-isocyanate-1 ("isophoronediisocyanate") are stirred at 60°. The reaction becomes exothermic; the temperature rises, after removal of the heating bath, to 108°. After completion of the exothermic reaction, the clear melt is stirred for a further 2 hours at 105°–110°. For testing of the addition, a sample is removed from the charge and its properties determined. The colourless solid adduct softens at ca. 30°C. Its epoxide content amounts to 2.50 equivalents/kg (100 percent of the theoretical value). The infra-red spectrum (capillary absorption, NaCl-disks) shows both N=C=O and

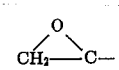

absorptions. The proton-magnetic resonance-spectrum (60 Mc HNMR, in CDCl₃ at 35°C, against tetramethylsilane) shows, amongst others, the following signals:

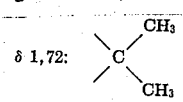

of hydantoin

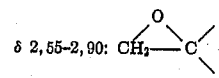

δ 0,98–1,40:
aliphatically bound CH₃—, cyclo-aliphatically bound —CH₂-protons

Accordingly, the product consists essentially of the compound of the following structure:

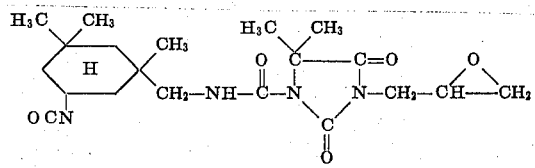

b. Adduct from 1 mole of 3(β-methylglycidyl)-5,5-dimethyl-6-isopropyl-5,6-dihydrouracil and 1 mole of toluylene-2,4-diisocyanate 125.6 g (0.494 moles) of a pure crystalline 3-(β-methylglycidyl)-5,5-dimethyl-6-isopropyl-5,6-dihydrouracil (M.P. = 105°–107°C) are melted and stirred at 110°C. An amount of 860 g (0.494 moles) of toluylene-2,4-diisocyanate is then added, with vigorous stirring, in the course of 10 minutes. The reaction is slightly exothermic. A pale-yellow liquid is obtained which can be easily stirred and which becomes increasingly more viscous. The reaction is allowed to proceed for 1 hour at 110°C and for a further 45 minutes at 140°C; the obtained adduct can then be poured on to a metal plate, on which it solidifies on cooling. The crystal mass is ground, and stored in a dry vessel. The obtained product melts at 128°C. The epoxide content of the adduct amounts to 2.4 equivalents/kg (corresponding to 100 percent of the theoretical amount). The product consists essentially of the epoxiisocyanate of the following structure:

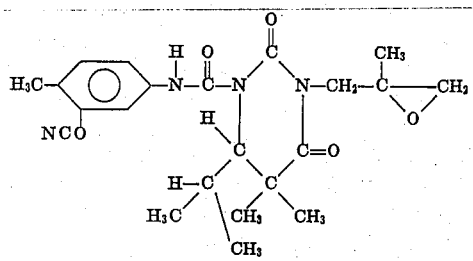

c. Adduct from 1 mole of 3-glycidyl-5,5-dimethylhydantoin and 1 mole of 1,3-di-(isocyanatopropyl)-5,5-dimethylhydantoin 36.8 g (0.2 moles) of 3-glycidyl-5,5-dimethylhydantoin are stirred at 60°C with 66.2 g (0.2 moles) of 89 percent 1,3-di-(isocyanatopropyl)-5,5-dimethylhydantoin. The reaction becomes exothermic; the temperature of the mixture rises to 94°C, and the reaction is allowed to continue for 90 minutes at 95°C. The new epoxyisocyanate, obtained in quantitative yield, is transferred to a glass flask, which is then sealed in an air-tight manner. The content of NCO-groups is 5.1 percent; the epoxide content amounts to 1.96 equivalents/kg (95 percent of the theoretical amount). The infrared spectrum confirms that the mixture obtained is essentially of the following structures:

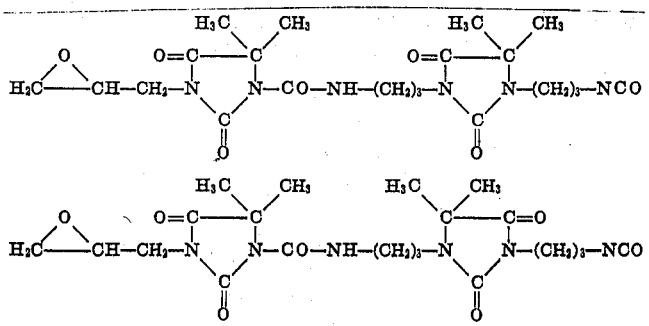

B. Model tests a. The following model experiment shows that organic isocyanates react with the $N_1$-H group of hydantoins to give stable adducts. With 5,5-dimethylhydantoin and phenylisocyanate as model substances, the reaction proceeds in the following manner:

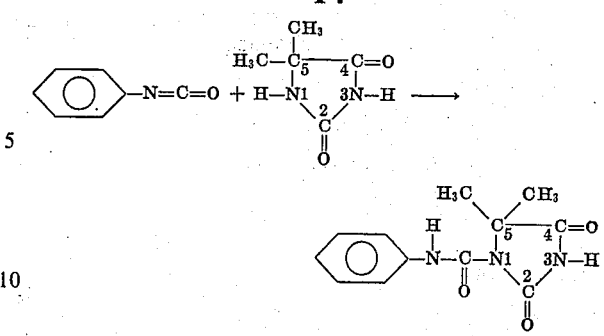

This reaction proceeds smoothly and with good yields. It is shown that the thus obtained derivatives are at least as thermostable as the urethanes obtainable from the corresponding isocyanates; this was tested by the following experiments:

A mixture of 128.1 g of 5,5-dimethylhydantoin (1 mole) and 119.2 g of phenylisocyanate (1 mole) is placed, at room temperature, in a 500 ml glass flask fitted with stirrer, thermometer and reflux condenser. The formed mass is heated within 15 minutes, with stirring, to 150°C internal temperature. A clear thinly fluid melt is obtained after ca. 80 minutes under the stated conditions. This melt is stirred for a further 2 hours at 160°C in order to complete the reaction. The mass crystallises immediately on cooling. In this manner are obtained 233 g of light-yellow crystals (yield: 94.3 percent of the theoretical amount).

The product is purified by being recrystallised from absolute ethanol. A practically colourless fine crystallisate, M.P. 166°–168°, is obtained in 69.8 percent net yield (172 g).

The elementary analysis gives the following result:

| Found: | Calculated: |
|---|---|
| 58.11 % C | 58.29 % C |
| 5.33 % H | 5.30 % H |
| 16.85 % N | 17.00 % N |

The infra-red spectrum shows, by the presence of bands for an aromatic ring and bands for the hydantoin structure, that the desired product is obtained. This finding is further verified by the presence of three amide-N-H frequencies (3280 $cm^{-1}$, 3202 $cm^{-1}$, 3095 $cm^{-1}$), and by three carbonyl absorption bands (1782 $cm^{-1}$, 1740 $cm^{-1}$, 1710 $cm^{-1}$).

Also the proton-magnetic resonance spectrum (60 Mc-NMR, taken in deuterchloroform at 35°C, with tetramethylsilane as the internal standard) indicates, by the presence of signals for the aromatic ring at δ = 6.95–7.55 (multiplet), of signals for $CH_3$ and N-H group of the hydantoin, besides the signal for the urea-amide (N-H)-group, that the obtained final product has the structure shown below:

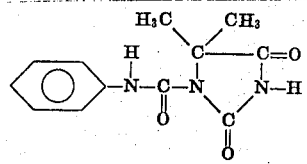

A specimen of 70 g of the thus synthetised compound is examined in a glass flask provided with descending condenser and thermometer, with respect to the thermal reverse splitting in phenylisocyanate and dimethylhydantoin. The substance is totally melted at a bath temperature of 175°C, and has a temperature of 168°C; there are no signs of a decomposition to be observed. The temperature of the specimen is then rapidly raised to 205°C; at this point too there is no sign of decomposition. At a temperature of 215°C, there are very faint signs of bubble formation in the melt. There commences at 232°C a very slow decomposition, and with a specimen temperature of 240°C, phenylisocyanate begins to distill off. A relatively rapid distillation commences at 260°C.

On the basis of this test, the decomposition point of the new substance can be given as 220°-230°C; on the other hand, urethanes from primary aliphatic alcohols and aromatic isocyanates are already decomposing from about 200°C.

b. The following experiment demonstrates that 3-glycidyl-5,5-dimethylhydantoin and phenylisocyanate as model substances react with each other smoothly and with good yield:

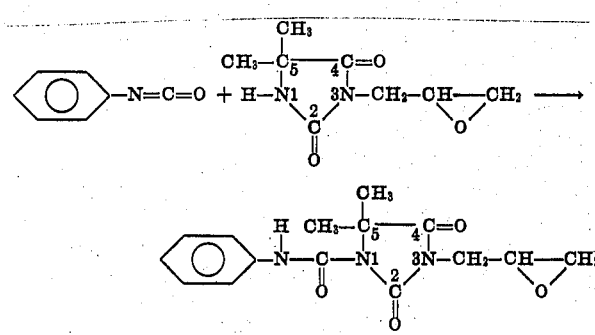

The isocyanate group hence reacts with the $N_1$-H group of the hydantoin, analogously to the manner described in the case of the model test (a), to give a stable adduct, whilst the glycidyl group remains intact.

A mixture of 36.8 g (0.2 moles) of 3-glycidyl-5,5-dimethylhydantoin (M.P. 85°-87°C, epoxide content 5.44 equivalents/kg, 100% of the theoretical amount), 100 ml of dioxane and 23.8 g of phenylisocyanate (0.2 moles) is prepared at room temperature, whereupon a clear colourless solution is obtained. The solution is stirred at 125°C bath temperature, resulting in an internal temperature of 104°-107°C. This temperature is maintained for 150 minutes; the solution is then cooled to room temperature, filtered, and completely concentrated in a rotary evaporator at 70°C under a water-jet vacuum; drying is subsequently carried out at 70°C under 0.1 Torr until constant weight is obtained, and the reaction product crystallises out.

Thus obtained are 60.6 g (yield: 100 percent of the theoretical amount) of a practically colourless crystallisate containing 2.95 epoxide equivalents/kg (89.4 percent of the theoretical amount).

The product is purified by recrystallisation from acetone, whereupon is obtained a colourless crystallisate which melts at 92°-93.5°C. The epoxide content of the purified product amounts to 3.18 equivalents/kg; this corresponds to 96.4 percent of the theoretical amount.

The elementary analysis shows:

| Found: | Calculated: |
|---|---|
| 13.85 % N | 13.86 % N |

The infra-red spectrum (Nujol trituration) shows, in contrast to the final product from model test a) for the hydantoin structure, only one amide-(N-H)-frequency at 3,320 $cm^{-1}$, but the same bands for carbonyl group and aromatic ring as the final product from model test a); furthermore, the absorption of the glycidyl group are now also visible. Also the proton-magnetic resonance spectrum is in agreement with the structure shown below.

The ultraviolet spectrum (taken in chloroform, concentration: $10^{-4}$ mol/litre) indicates a λ max at 249 μm with the extinction $E_1^1$ max of 15,100.

The mass spectrum proves moreover the structure given below. The molecule-ion appears quite pronounced with 303 units of mass; this is in agreement with the theoretical molecular weight of 303.3. The fragment-ion with 184 units of mass might well come from the isocyanate cleavage from the molecule-ion.

The product thus consists of the monoepoxide of the structure:

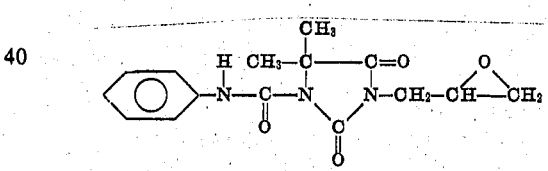

C. Production examples

EXAMPLE 1

An amount of 160.5 g (0.4 moles) of the epoxyisocyanate produced according to instruction A.2.a. (adduct from 1 mole of isophoronediisocyanate and 1 mole of 3-glycidyl-5,5-dimethylhydantoin) is stirred together with 100 ml of dioxane and 18.3 g of butane-1,4-diol (0.2 moles) for 3 hours at 80°-85°C. The clear solution is subsequently concentrated by evaporation, and dried under 0.1 Torr at 65°C until constant weight is obtained. A colourless epoxide resin is obtained in quantitative yield (178.8 g) having 2.0 epoxide equivalents/kg (88.2 percent of the theoretical amount), which melts at 86°-88°C. The elementary analysis shows:

| Found | Calculated |
|---|---|
| 58.4% C | 58.5% C |
| 8.0% H | 7.8% H |
| 12.3% N | 12.4% N |
| 0.4% Cl | 0.0% Cl |

The proton-magnetic resonance spectrum likewise shows that the product consists essentially of the diepoxide of the following structure:

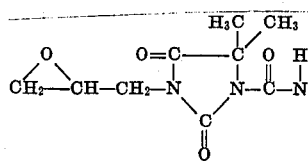

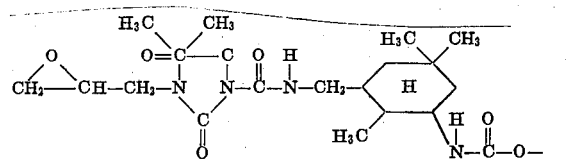

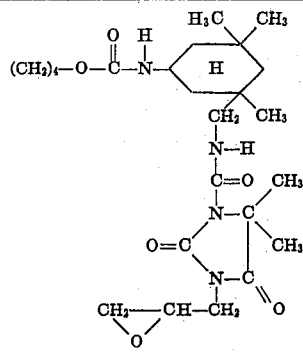

EXAMPLE 2

In a dry glass flask fitted with stirrer, thermometer and reflux condenser, 187 g of 3-glycidyl-5,5-dimethylhydantoin (1.0 mole) are stirred at 100°C with 300 ml of dioxane. To this solution is then added dropwise within 30 minutes, with stirring, a solution of 168.2 g of hexamethylenediisocyanate (1.0 mole) in 100 ml of dioxane. The colourless clear solution is stirred for 120 minutes at 100°–105°C. To the solution of the intermediate product are then added dropwise, within 30 minutes at 102°–105°C, 45.1 g of butane-1,4-diol in 50 ml of dioxane; and stirring is afterwards continued for a further 2 hours at 105°–106°. On cooling of the solution to room temperature, the major part of the product precipitates; this is filtered off and the obtained colourless powder dried at 80°C. Thus obtained are 295 g of the product (73 percent of the theoretical amount), which softens at 130°C. The epoxide content amounts to 2.27 equivalents/kg (91 percent of the theoretical amount). It is possible to obtain from the mother solution a further 20 percent of final product.

The elementary analysis gives the following values:

| found | calculated |
|---|---|
| 7.3% H | 7.35% H |
| 14.1% N | 14.10% N |
| 0.3% Cl | 0.0% Cl |

Accordingly, the product consists essentially of the diepoxide of the following structure:

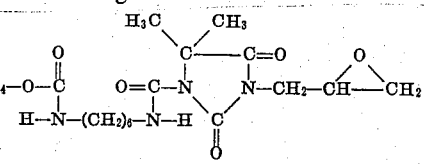

EXAMPLE 3

Analogously to Example 2, 187 g of 3-glycidyl-5,5-dimethylhydantoin (1 mole) are reacted in 600 ml of dioxane with 168.2 g of hexamethylenediisocyanate (1 mole) in 150 ml of dioxane; and the intermediate is then reacted with 178.2 g (0.5 moles) of 1,1'-methylene-bis-(3-(β-hydroxyethyl)-5,5-dimethylhydantoin, this being added in portions in the course of 20 minutes. The reactions are performed analogously to Example 2. The slightly cloudy solution is then cleared by filtration, completely concentrated at 70°C in a rotary evaporator under a low vacuum, and subsequently dried at 65°C/0.1 Torr until constant weight is obtained. A colourless powder is obtained in quantitative yield (534 g), the epoxide content of the powder being 1.76 equivalents/kg (94 percent of the theoretical value).

The product consists essentially of the diepoxide of the following structure:

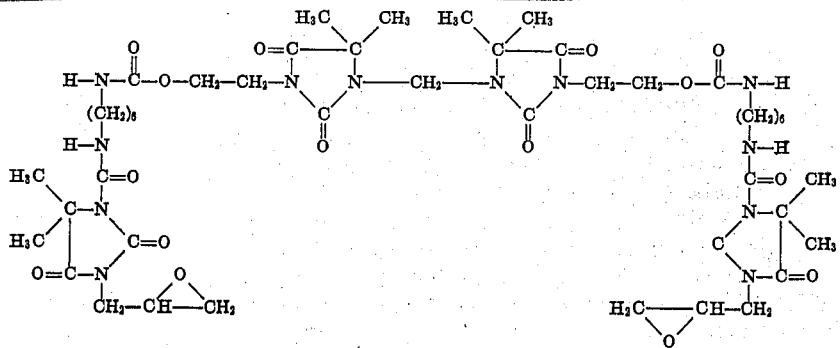

EXAMPLE 4

In a glass apparatus according to Example 2, 367.6 g of 3-glycidyl-5,5-dimethylhydantoin (corresponding to 2.0 moles) are stirred at 120°C. An addition is then made dropwise, within 30 minutes and with vigorous stirring, of 444.6 g of isophoronediisocyanate (1.0 mole). The reaction is slightly exothermic; after the heating bath has been removed, the temperature rises to 137°C. A colourless clear solution is obtained, which is stirred for a further 2 hours at 130°C. To this solution are then added dropwise within 30 minutes, with stirring, 425 g (1.0 mole) of polypropylene glycol (mean molecular weight 425, OH-groups terminated). The reaction is completed over a further 2 hours at 130°C. The obtained product is poured into a sheet-metal box. In quantitative yield is obtained a pale-yellow, clear transparent epoxide resin which softens at 130°C. The epoxide content amounts to 1.38 equivalents/kg (85.4 percent of the theoretical amount). The total chlorine content is below 0.3 percent. The elementary analysis shows 8.5 percent H (theroretically 8.47 percent) and 8.9 percent N (theoretically 9.04 percent).

The product consists essentially of the diepoxide of the following structure:

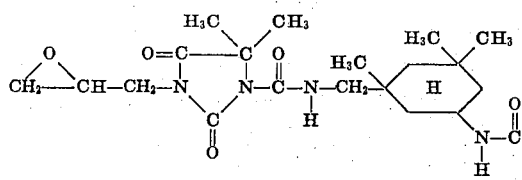

wherein *n* has an average value of 7.

EXAMPLE 5

An amount of 202.2 g of the epoxyisocyanate produced according to instruction A. 2. (b) (adduct from 1 mole of toluylene-2,4-diisocyanate amd 1 mole of -(β-methylglycidyl)-5,5-dimethyl-6-isopropyl-5,6-dihydrouracil) is reacted at 140°-144°C. for one hour, with thorough stirring, with 19.36 ml of cis-1,4-butenediol. The obtained highly viscous diepoxide is subsequently poured on to a metal sheet for cooling. The resin is broken up and ground. It melts at 115°C. The epoxide content is 2.07 equivalents/kg (this corresponds to 97.8 percent of the theoretical amount); the product consists essentially of the diepoxide of the following structure:

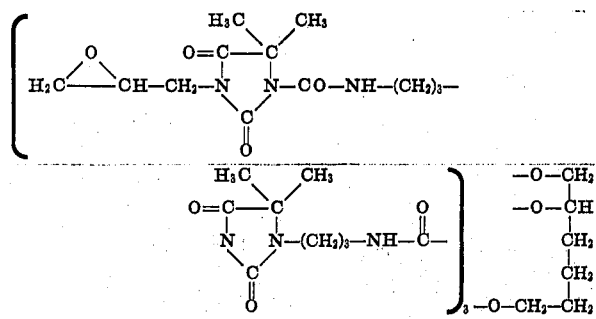

EXAMPLE 6

19.15 g (0.025 moles) of the epoxideisocyanate produced according to instruction A. 2. (c) in 300 ml of dioxane are stirred at 95°C. A solution of 1.04 g of hexane-1,2,6-triol in 100 ml of dioxane is then added dropwise at 100°C within 20 minutes, and stirring is continued at 100°C for a further 4 hours. The clear solution is concentrated at 60°C in a rotary evaporator under 20 Torr to dryness, and afterwards dried under 0.15 Torr until constant weight is obtained. A colourless, clear, brittle epoxide resin is obtained in quantitative yield; the said epoxide resin softens at 51°C, its epoxide content is 1.62 equivalents/kg (84.3 percent of the theoretical amount), and its structure corresponds essentially to the following formula, or to the isomeric form thereof:

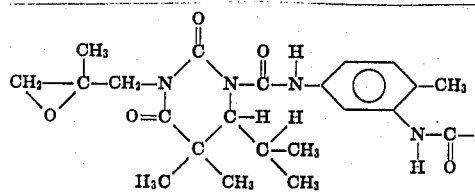

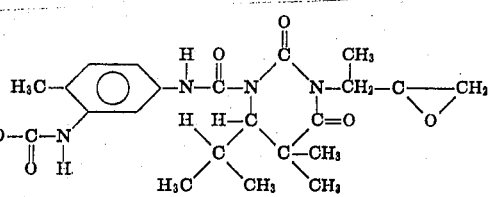

EXAMPLE 7

In accordance with Example 6, 45.9 g (0.06 moles) of the epoxideisocyanate obtained according to instruction A. 2. c) are reacted in 300 ml of dioxane with 4.26 g (0.03 moles) of Δ³-cyclohexenedimethanol in 100 ml of dioxane. The processing is thereupon carried out analogously to the manner described in Example 6.

In quantitative yield is thus obtained a clear, light-yellow, solid epoxide resin which softens at 52°C, and the epoxide content of which is 1.59 equivalents/kg (87.4 percent of the theoretical amount). The new epoxide resin corresponds essentially to the following structure (or to the isomeric form):

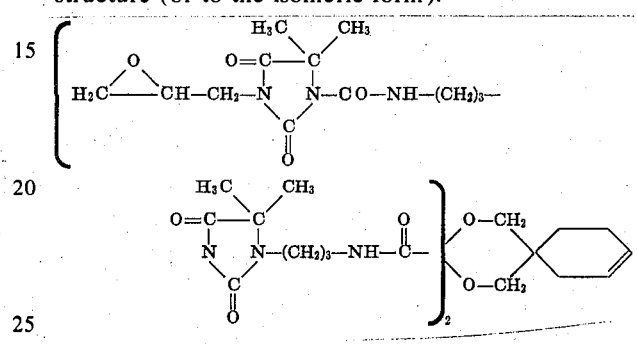

D. Application examples

EXAMPLE I

An amount of 77.5 g of the epoxide resin produced according to Example 1 and having an epoxide content of 2.0 epoxide equivalents/kg is mixed at 80° with 22.4 g of hexahydrophthalic acid anhydride; to the clear melt are added 0.3 g of benzyldimethylamine. This mixture is poured into aluminium moulds of 4 mm wall thickness, the moulds being preheated to 80°C. The curing occurs according to the following programme: 2 hours/80°C + 2 hours/150°C + 12 hours/150°C. In this manner are obtained clear light-yellow moulded shapes having the following properties:

| | |
|---|---|
| bending strength (VSM 77103): | 7-8 kp/mm² |
| deflection (VSM 77103): | 2.0 mm |
| impact strength (VSM 77105) | 37.3 cm kp/cm² |
| mechanical dimensional stability at elevated temperature according to Martens (DIN 53 458): | 123°C |
| water absorption, 4 days/20°C (DIN 53472) | 0.68% |

EXAMPLE II

In accordance with Example I, a mixture of 150.4 parts of the epoxide resin produced according to Example 2 (epoxide content = 2.27 equivalents/kg) and 50 g of hexahydrophthalic acid anhydride is processed to obtain molded shapes; these then possess the following properties:

| | |
|---|---|
| bending strength (VSM 77103): | 12-15 kp/mm² |
| deflection (VSM 77103) | 4.5-5.6 mm |
| impact strength (VSM 77105): | 11 cm.kp/cm² |
| water absorption (4 days, 120°C) (DIN 53472) | 0.56% |

EXAMPLE III

A mixture of 85.4 g of the epoxide resin produced according to Example 4 (epoxide content = 1.38 equivalents/kg) and 15.9 g of hexahydrophthalic acid anhydride is poured into aluminium moulds, and cured according to the following programme: 2 hours/90°C + 15 hours/140°C. The moulded shapes then possess the following properties:

| | |
|---|---|
| bending strength (VSM 77103): | 11–12 kp/mm² |
| deflection (VSM 77103): | 4.3–5.0 mm |
| impact strength (VSM 77105): | 10–13 cm.kp/cm². |

We claim:
1. A compound of the formula

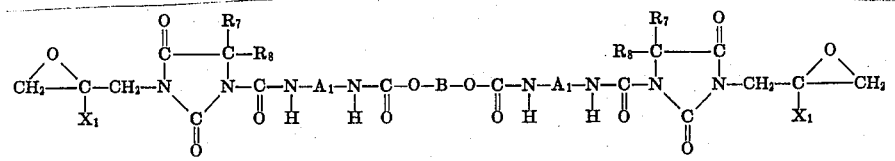

wherein $A_1$ is alkylene of 2 to 10 carbon atoms, cyclopentylene, cyclohexylene, tolylene, phenylene,

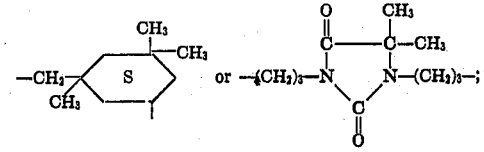

$X_1$ is hydrogen or methyl; B is alkylene of 2 to 12 carbon atoms,

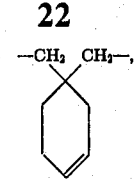

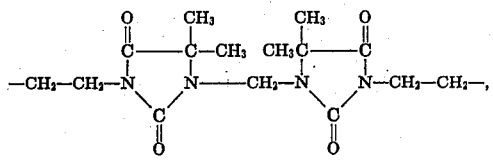

or

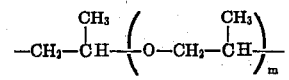

wherein $m$ is an integer corresponding to an average molecular weight of 250 to 2,500 for the group; $R_7$ and $R_8$ is hydrogen or alkyl of 1 to 4 carbon atoms or $R_7$ and $R_8$ together is tetramethylene or pentamethylene.

2. The compound according to claim 1 having the formula:

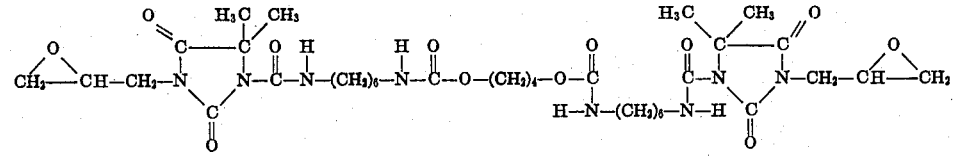

3. The compound according to claim 1 having the formula:

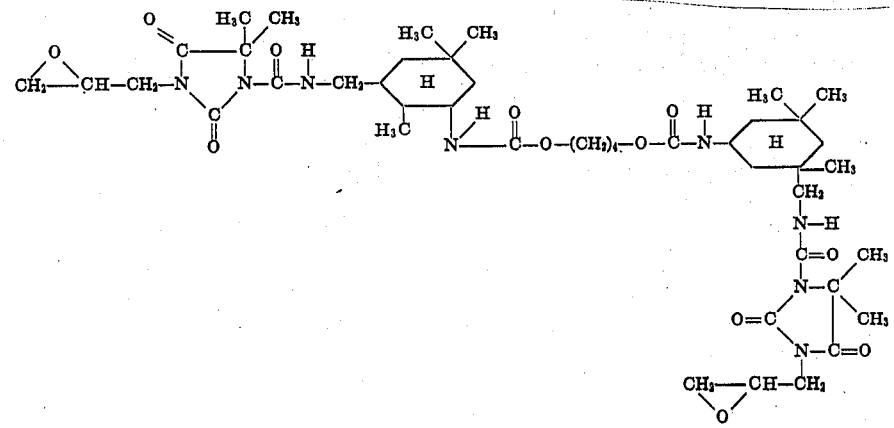

4. The compound according to claim 1 having the formula:
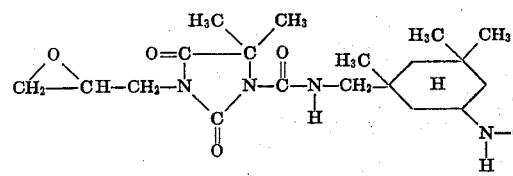
5. The compound according to claim 1 having the formula:
6. The compound according to claim 1 having the formula:
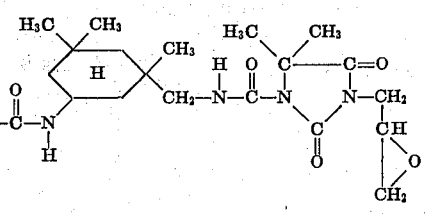
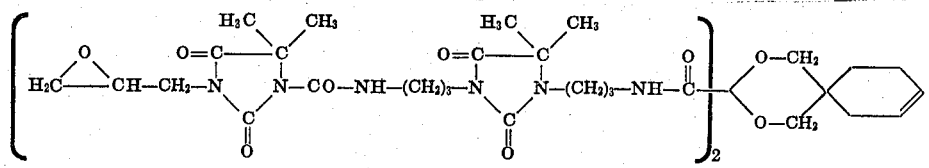
wherein n has an average value of 7.
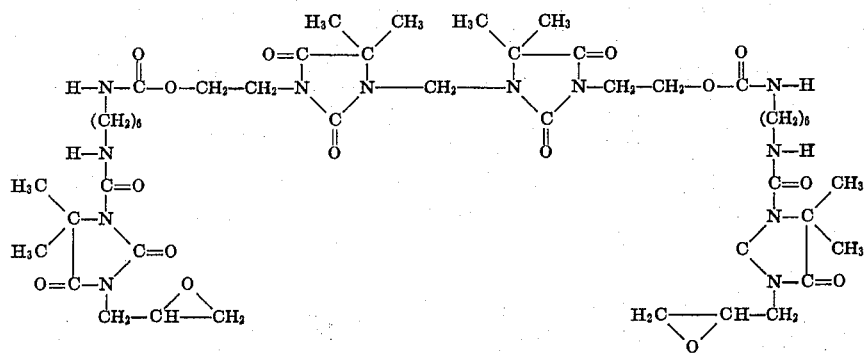
7. A compound of the formula:
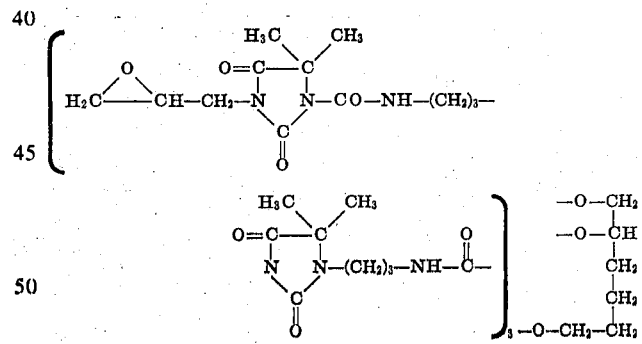
* * * * *